Jan. 17, 1961 M. G. COPLEN 2,968,124
PLANT CONTAINER
Filed May 10, 1957 2 Sheets-Sheet 1
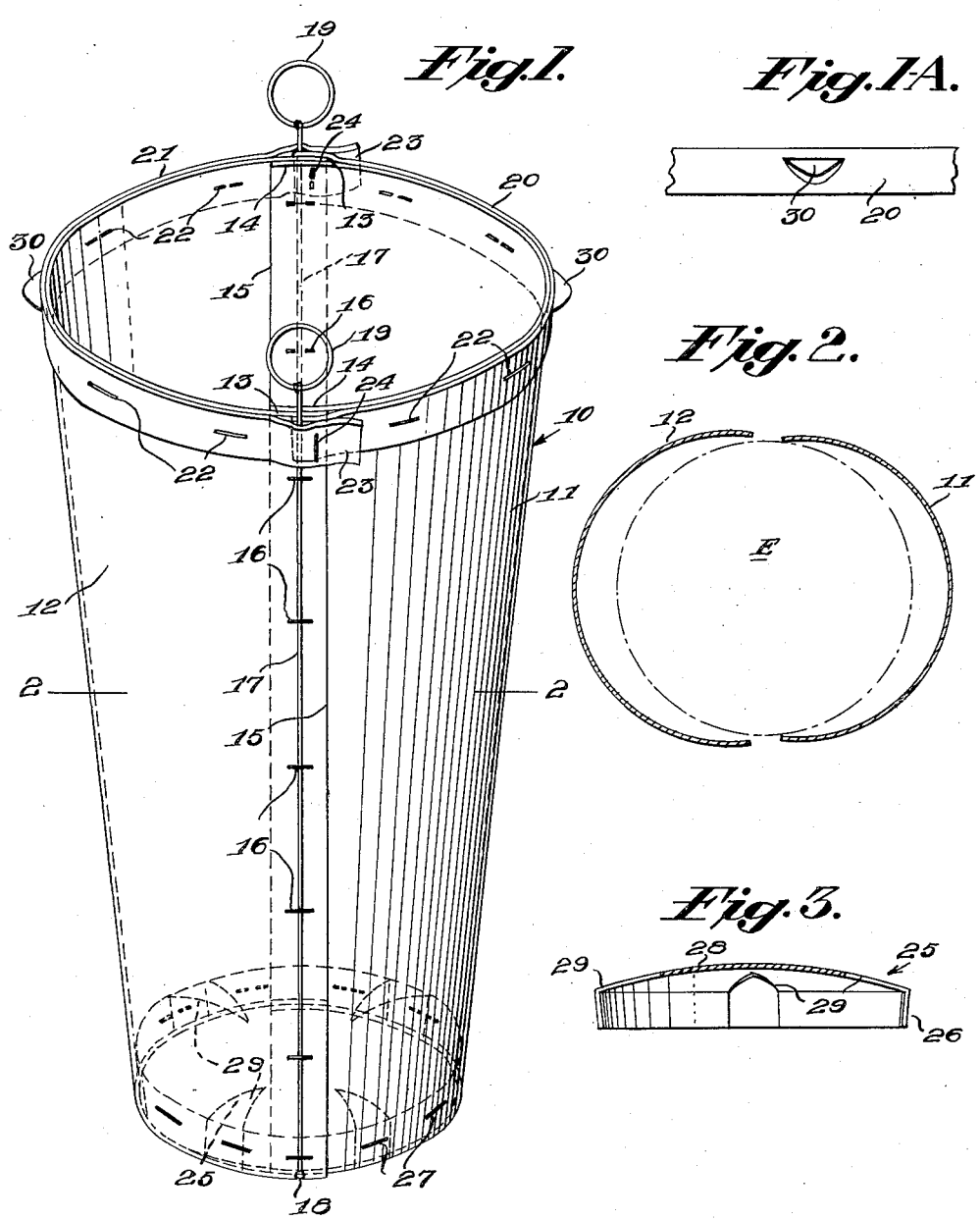
INVENTOR
*Milo G. Coplen*
BY *Stone + Mack*
ATTORNEYS.

Jan. 17, 1961
M. G. COPLEN
2,968,124
PLANT CONTAINER
Filed May 10, 1957
2 Sheets-Sheet 2
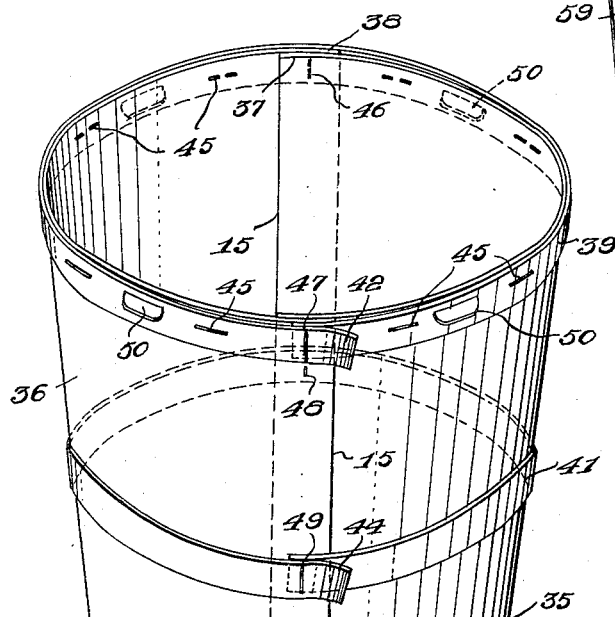
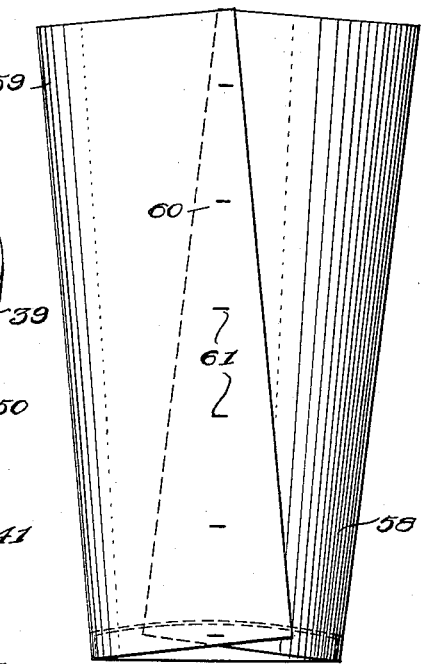
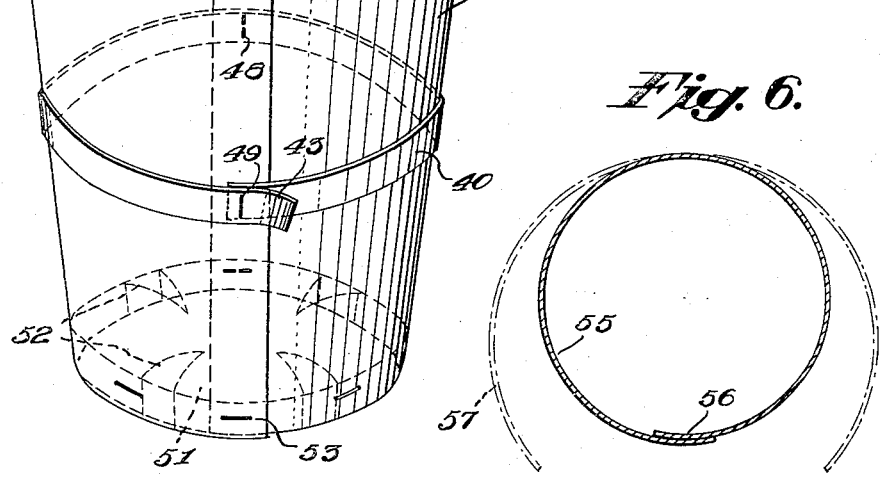
INVENTOR
Milo G. Coplen
BY Stone + Tracks
ATTORNEYS.

United States Patent Office 2,968,124
Patented Jan. 17, 1961

2,968,124

PLANT CONTAINER

Milo G. Coplen, Rock Creek Nurseries, Rockville, Md.

Filed May 10, 1957, Ser. No. 658,362

5 Claims. (Cl. 47—37)

This invention relates to a plant pot.

The invention is more particularly concerned with pots for the early growth of plants which are intended to be transplanted for later growth to maturity.

Pots of both metal and paper construction are now used, particularly in nurseries, for starting plants, which may be flowers or vegetables and the general practice is to fill the pots with soil and start the plants therein.

This method of starting plants has proven satisfactory but the potted plants often suffer a relapse in the transplanting thereof which of course is necessary to provide sufficient root growth room particularly for plants which eventually attain a substantial size.

The main reason for growth relapse in transplanted plants is due to the fact that the pot retained soil is not maintained in intimate contact with the plants during the transfer thereof from the pots into larger soil areas.

In the practice now generally in vogue in the transplanting of potted plants, whether the pots be of paper or metallic construction, difficulty is experienced in removing the plants from the pots without disturbing the roots or the ball of soil encompassing same due to the fact that the pots are of single wall construction and it is accordingly necessary to cut the wall with a knife or break same with other tools and which practice has been found very difficult to carry out without disturbing the ball of soil with a resulting backset to the plant growth.

It is accordingly a primary feature of this invention to provide a plant pot whereby in the use thereof, the above noted transplanting objections are wholly overcome.

It is a further and more specific feature of the invention to provide a plant pot whose frusto conical wall embodies a readily releasable seam extending throughout the height of the pot whereby the pot wall whether of paper or thin metal construction is capable of being spread open with a resulting separation thereof from the ball of soil which is maintained intact and ready for depositing into the outdoor soil without any disturbance of the plant roots.

A still further feature of the invention is the provision of a plant pot of the above noted general character which is provided with moisture drainage means and other means for retaining mulch on the exposed surface of the ball of earth in the pot.

Other features and advantages of the invention will become apparent in the course of the following detailed description, taken in connection with the accompanying drawings, wherein:

Fig. 1 is a perspective view of a plant pot constructed in accordance with one physical embodiment of the invention;

Fig. 1–A is a fragmental elevational view of the band encircling the upper open end of the pot;

Fig. 2 is a more-or-less diagrammatic transverse sectional view of the pot in the location of line 2—2 on Fig. 1 and showing the pot sections being removed from the ball of earth initial'y retained by the pot;

Fig. 3 is a diametrical vertical sectional view of the bottom of the pot;

Fig. 4 is a perspective view corresponding to Fig. 1 and disclosing a second structural embodiment of the invention;

Fig. 5 is a side elevational view of a partially constructed pot in accordance with another structural embodiment thereof; and Fig. 6 is a diagrammatical transverse sectional view similar to Fig. 2 but disclosing a pot whose wall embodies a single section rather than a pair of sections as in Fig. 2.

Referring now in detail to the drawings, and first to Figs. 1 to 3 thereof, the improved pot 10 comprises a pair of side wall sections 11 and 12, the edges 13 of the latter lapping the edges 14 of the former in the provision of a pair of diametrically opposed vertical seams 15. Each seam 15 is releasably closed by means of a series of vertically spaced horizontal staples 16 which extend over a wire or strip 17 whose lower end is suitably secured to the pot as at 18 and whose upper end is provided with a finger engegeable ring or loop 19.

A pair of band sections 20 and 21 surround the upper ends of the pot wall sections 11 and 12 and have their ends in lapped relation in the range of the side wall seams 15. The band sections 20 and 21 are secured to the side wall sections 11 and 12 by means of horizontal staples 22 and the over!aping ends or tabs 23 of the band section 21 extend over the wire or strip 17 and are releasably secured to the underlapping band ends by means of vertical staples 24.

The pot is provided with a bottom 25 which, as is more clearly shown in Fig. 3, includes a circular side wall 26 which is secured within the lower ends of the side wall sections 11 and 12 by means of horizontal staples 27. The said bottom further includes an upwardly convex top wall 28 which adjacent side wall 26 is provided with drainage openings 29.

The band sections 20 and 21 are preferably provided with a pair of diametrically opposed lugs 30 which in conjunction with the loops 19 may be used for suitable lacing to hold a mulch or packing on top of the earth within the pot.

The pot 10 may be of paper or metal construction and of relatively thin gauge. When using metal, there are preferably a pair of sections as in Fig. 1 while, if paper be used, there may well be a single section as indicated in Fig. 6.

The improved pot as above described is opened in the fol'owing manner. The tabs 23 are given a sharp jerk with a resulting of the pulling of staples 24. Thereafter the loops 19 are grasped and given a sharp outward and downward pull whereby the overlying staples 16 are released with a resulting opening of the seams 15.

With the sections 11 and 12 released they may readily be parted as indicated in Fig. 2 with a resulting of freeing the earth ball E indicated by dot-and-dash lines in Fig. 2 whereby the plant roots are not disturbed and there is no set back in the transplanting operation.

In the modified embodiment of the invention according to Fig. 4, the pot comprises a pair of side wall sections 35 and 36 whose edges 37 and 38 respectively are lapped as in the first embodiment.

In this embodiment a plurality of bands surround the side wall sections and which may include a top band 39, a bottom band 40 and an intermediate band 41. The bands are all of one piece construction with overlapping ends d'sposed in overlying relation to one of the side wall seams 15, the said overlapping ends of the bands comprising outer finger engageable tabs 42, 43 and 44 respectively. The top band 39 is secured to the upper ends of the side wall sections 35 and 36 by means of a circumferential series of horizontally disposed staples 45 and vertical staples 46 and 47 extend through the overlapping edges 37 and 38 with the staple 47 extending through the tab 42.

The bands 40 and 41 are secured only to the overlapping edges of the side wall sections as by means of vertical staples 48 extending through the bands 40 and 41 intermediate their ends and vertical staples 49 extending through the tabs 43 and 44.

The band 39 is preferably provided with a circumferential series of stamped out lugs 50 for use as above referred to in connection with the lugs 30 in the first embodiment of the invention.

The pot is provided with a bottom corresponding to the bottom 25 in the first embodiment and which is indicated at 51. The bottom is provided with drainage openings 52 and same is secured to the lower ends of the pot sections 35 and 36 by a circumferential series of staples 53.

The pot in accordance with this embodiment is opened by pulling outwardly on tabs 42 to release the staple 47 and thereafter the tabs 43 and 44 are pulled outwardly with a releasing of the staples 49. With the two seam construction disclosed the bands are of course pulled around to release the staples 46 and 48 whereby the opposed pot sections 35 and 36 may be readily separated for withdrawal of the ball of earth without damage to the plant or plants rooted therein.

In Fig. 6 is illustrated a single pot wall section 55 having a single overlap seam 56 and which upon releasing the seam 56 is capable of being drawn outwardly as indicated at 57 in dot-and-dash lines.

Due to the fact that paper is more flexible than metal, the paper pots will preferably be formed with a single side wall section having a single seam while the metal pots will preferably comprise a pair of side wall sections having a pair of diametrically opposed seams as in Figs. 1 and 4.

While for the sake of neatness in appearance the side wall sections in the embodiments of Figs. 1 and 4 are die cut to provide uniform width seams and horizontal top and bottom ends, the pot may however be expeditiously formed by a pair of truly rectangular sections 58 and 59 as indicated in Fig. 5. In this construction the seam 60 stapled as at 61 will be of uniformly increasing width from top to bottom and the top and bottom edges of the sections will not be in parallel planes. However the top band and the bottom for the pot will provide plane top and bottom edges for the pot.

From the above description it will be apparent that a plant pot is provided which is capable of expeditious manufacture at relatively low cost and is well adapted for the starting of plants which may be transplanted without any set back in their growth.

I claim:

1. A plant pot comprising a pair of side wall portions having diametrically opposed overlapped edge portions extending from the bottom to the top of the pot, said edge portions being releasably secured together by means of a series of staples disposed in spaced relation lengthwise of the said edge portions, a band encircling the upper end of said side wall portions and being secured thereto by staples disposed in spaced relation circumferentially of the band, said band having overlapped end portions in overlying relation to said overlapped edge portions of said side wall, said overlapped end portions of said band being releasably secured together by means of a staple, a bottom member disposed within the lower end of said side wall which comprises a circular wall conforming with said side wall and secured thereto by circumferentially spaced staples, said bottom member further comprising an upwardly convex top wall, said top wall being provided with circumferentially spaced drainage openings adjacent said circular wall, and a plurality of lugs projecting outwardly of said band adapted to engage lacing for holding mulch on the top of the pot.

2. A plant pot comprising a frusto-conical side wall having overlapped edge portions throughout its vertical extent, an elongated strip overlying the outer one of said overlapped portions and having its lower end secured to the lower end of the pot, a plurality of vertically spaced staples extending over said strip and through said overlapped portions for initially retaining same in position, a band surrounding the upper end of said side wall and having overlapped end portions overlying said overlapped side wall portions, said strip extending between said band overlapped end portions which are secured together at a point intermediate said strip and the free end of the outermost one of said band overlapped end portions, and said strip extending above said band and having a finger engageable ring secured thereto, whereby upon grasping same and exerting a laterally outward pull thereon, the overlapped end portions of the band and the overlapped edge portions of the side wall will be released for facilitating withdrawal of a plant root encompassing ball of soil without disturbing the roots therein.

3. A plant pot according to claim 2 wherein said plant pot comprises a pair of diametrically opposed sections with overlapped edge portions diametrically opposed to said first overlapped edge portions, and said band comprising a pair of diametrically opposed sections with overlapped ends diametrically opposed to said first overlapped ends, and said overlapped edge portions and end portions being secured together similarly to said first edge portions and end portions and being provided with a strip and a ring similarly to said first strip and ring for releasing the side wall edge portions and the band end portions.

4. A plant pot comprising a pair of semi-frusto-conical side wall members having diametrically opposed overlapped edge portions, a band encircling the upper ends of said members and being secured thereto at circumferentially spaced points, a pair of bands disposed below said first band with all three bands in vertically spaced relation, said pair of bands each being secured intermediate its ends to the overlapped edge portions at one side of the pot, said first band and each of said pair of bands having overlapped ends at the opposite side of the pot, said overlapped ends being stapled to the corresponding overlapped edge portions at points inward of the extremities of the outermost of said overlapped ends and providing finger engageable tabs for releasing said corresponding edge portions.

5. A plant pot according to claim 4 together with a bottom member including a circular wall conforming with said side wall members and secured thereto at circumferentially spaced points, said bottom member further including an upwardly convex wall and said circular wall and said top wall being jointly provided with circumferentially spaced drainage openings.

References Cited in the file of this patent

UNITED STATES PATENTS

| | | |
|---|---|---|
| 681,066 | Millingar | Aug. 20, 1901 |
| 903,381 | Hutchinson | Nov. 10, 1908 |
| 952,197 | Hussey | Mar. 15, 1910 |
| 2,340,373 | Gardner | Feb. 1, 1944 |
| 2,341,374 | Gardner | Feb. 8, 1944 |
| 2,640,623 | Ryder | June 2, 1953 |
| 2,661,574 | Ritter | Dec. 8, 1953 |
| 2,818,681 | Coplen | Jan. 7, 1958 |

FOREIGN PATENTS

| | | |
|---|---|---|
| 159,003 | Australia | Sept. 23, 1954 |
| 422,337 | Great Britain | Jan. 9, 1935 |
| 697,874 | Great Britain | Sept. 30, 1953 |
| 223,891 | Switzerland | Jan. 19, 1943 |